(12) United States Patent
King

(10) Patent No.: US 6,461,713 B2
(45) Date of Patent: Oct. 8, 2002

(54) CARRIER WITH SET DOWN ELONGATION REDUCING MEMBER

(75) Inventor: Cedric King, Knoxville, TN (US)

(73) Assignee: Schlegel Corporation, New York, NY (US)

( * ) Notice: Subject to any disclaimer, the term of this patent is extended or adjusted under 35 U.S.C. 154(b) by 0 days.

(21) Appl. No.: 09/739,409

(22) Filed: Dec. 18, 2000

(65) Prior Publication Data

US 2002/0102383 A1 Aug. 1, 2002

(51) Int. Cl.[7] .................................................. B32B 5/08
(52) U.S. Cl. ........................ 428/108; 428/122; 428/105; 99/475.1; 99/490.1
(58) Field of Search ................................ 428/108, 122, 428/105; 49/475.1, 490.1

(56) References Cited

U.S. PATENT DOCUMENTS

| | | |
|---|---|---|
| 1,533,490 A | 4/1925 | Wirfs |
| 1,556,655 A | 10/1925 | Whitney |
| 2,026,973 A | 1/1936 | Greene |
| 2,156,164 A | 4/1939 | Pierce |
| 2,191,549 A | 2/1940 | Spraragen |
| 2,195,046 A | 3/1940 | Best |
| 2,257,603 A | 9/1941 | Harrah |
| 2,337,303 A | 12/1943 | Sparagen |
| 2,459,120 A | 1/1949 | Sparagen |
| 2,699,582 A * | 1/1955 | Schlegel ................ 49/490.1 |
| 2,754,575 A | 7/1956 | Bruce |
| 2,923,983 A | 2/1960 | Morton et al. |
| 2,954,310 A | 9/1960 | Truesdell et al. |
| 3,172,800 A | 3/1965 | Truesdell et al. |
| 3,238,689 A | 3/1966 | Cook, Jr. |
| 3,430,387 A | 3/1969 | Cook, Jr. |
| 4,078,110 A | 3/1978 | Flethcher et al. |
| 4,343,845 A | 8/1982 | Burden et al. |
| 4,517,233 A * | 5/1985 | Weichman ................ 49/490.1 |
| 4,624,093 A | 11/1986 | Gibson |
| 4,934,100 A | 6/1990 | Adell |
| 4,982,529 A | 1/1991 | Mesnel |
| 5,009,947 A | 4/1991 | McManus et al. |
| 5,072,567 A | 12/1991 | Cook et al. |
| 5,143,666 A | 9/1992 | McManus et al. |
| 5,204,157 A | 4/1993 | Matsumiya |
| 5,416,961 A | 5/1995 | Vinay |
| 5,437,124 A | 8/1995 | Ahlfeld et al. |
| 6,079,160 A | 6/2000 | Bonds |
| 6,150,003 A * | 11/2000 | McCutchan ................ 428/122 |

FOREIGN PATENT DOCUMENTS

| | | |
|---|---|---|
| FR | 2149567 | 3/1973 |
| GB | 1396577 | 6/1975 |
| GB | 2178468 | 2/1987 |

* cited by examiner

*Primary Examiner*—Alexander S. Thomas
(74) *Attorney, Agent, or Firm*—Brian B. Shaw, Esq.; Stephen B. Salai, Esq.; Harter, Secrest & Emery LLP

(57) ABSTRACT

A carrier for use in the manufacture of weatherseals is disclosed, the carrier having a serpentine frame and at least one elongation reducing member extending along its longitudinal dimension. The elongation reducing member may be secured to the frame in a set down relationship. The elongation reducing member can be a cable joined to the a plurality of limbs in the frame to maintain a maximum spacing between adjacent limbs along the longitudinal dimension. The resulting carrier is prevented from elongating during an extrusion process and thus a resulting product has reduced shrinkage.

66 Claims, 6 Drawing Sheets

CARRIER WITH SET DOWN ELONGATION REDUCING MEMBER

FIELD OF THE INVENTION

The present invention relates to a carrier used for reinforcement of an elastomeric strip typically employed in sealing systems, such as for example, gripping and covering edge flanges surrounding an opening in a vehicle body. More particularly, the present invention relates to a carrier, which does not stretch when coated in an elastomeric extrusion process and which in turn does not shrink after being cut to length, installed, and used in the operating environment.

BACKGROUND OF THE INVENTION

Carriers, such as wire carriers typically include a continuous wire weft formed into a serpentine frame having limbs interconnected by connecting regions at each end of the limbs, with a polymeric warp weft knitted, sewn, threaded, or otherwise disposed on the limbs.

Such a wire carrier is widely used, mainly as a reinforcing frame, which is encapsulated in a polymeric material especially in extruded products, such as weatherseals for motor vehicles. During the manufacture of the seals, the wire carrier is passed through an extrusion process and is thus subjected to stresses and elevated temperatures, which can cause the warp threads to stretch longitudinally. When the warp threads are processed with a tensile stress during extrusion, the resultant product may experience shrinkage after being finally sized and installed, which becomes a problem for the installer as well as the end customer.

In spite of these issues, the serpentine carrier provides substantial benefits. Specifically, the wire carrier exhibits an inherent flexibility about three axes, which in turn provides good handling characteristics of the finished product. In addition, the wire carrier is able to bear relatively high loading, particularly during the extrusion process. This is in contrast to many stamped as well as lanced and stretched metal carriers. In addition, the serpentine carrier has the benefit of withstanding greater flexing without exhibiting metal fatigue. Thus, there is a need to develop a stable serpentine carrier for extruded and molded polymeric products, which overcomes these problems.

The use of various materials for warp threads has reduced but not yet solved the problem of elongation. That is, even using warp threads made from materials having zero to very low elongation factors does not completely prevent a wire carrier from suffering from elongation and eventual shrinkage. For example, even if fiberglass threads, which have a very low elongation factor, were used as the warp threads in a wire carrier, the knotted junctions of the warp threads around the wire carrier substantially reduces the ability of the warp threads to reduce elongation of the warp threads and hence the wire carrier. While the short lengths of the warp thread between the knots may be free of elongation during extrusion, the knots themselves are apt to become tighter during extrusion and looser after processing, thereby changing the length of warp thread between the limbs. Thus, even employing warp threads with very low elongation factors may not effectively prevent carrier elongation and subsequent shrinkage.

Thus, there is a need to reduce final product shrinkage by reducing carrier elongation during pre-forming, extrusion, post-forming and cut to length. There is further a need to reduce the shrinkage that is realized in weatherseals in the short term after extruding, during secondary operations, and after extended time in the field. There is further a need to retain the spacing between the limbs of the carrier during extrusion processing, thereby preventing elongation. There is further a need for an inexpensive elongation prevention mechanism. There is a further need for such an elongation prevention mechanism, which is easy to incorporate into the manufacture of a serpentine carrier, such as a wire carrier, without requiring additional extrusion lines or substantially increasing material requirements.

SUMMARY OF THE INVENTION

The present invention provides a carrier with an elongation reducing member, which provides enhanced length stability in a resulting product, such as a weatherseal, while retaining the advantageous flexibility of a serpentine carrier. The present carrier includes an elongation reducing member, which is connected to a plurality of adjacent limbs in the carrier. Preferably, the elongation reducing member is flexible intermediate the adjacent limbs to retain the inherent flexibility of the carrier, and is sufficiently strong to preclude increased separation of the adjacent limbs.

The present invention further provides an elongation reducing member which is inexpensive, and can be employed without requiring retooling of existing extrusion dies or substantial increase material requirements.

In a first configuration of the present invention, a carrier for use in a weatherseal includes a filament such as a wire folded into a serpentine frame so as to have a plurality of limbs interconnected at alternate ends by connecting regions, the limbs generally extending transverse to a longitudinal axis of the carrier. The carrier has a width substantially defined by a length of one of the plurality of limbs. The filament has a given thickness, or diameter. The carrier also includes at least one elongation reducing member generally extending along the longitudinal axis of the carrier, wherein the elongation reducing member is connected to the plurality of limbs in a set down relationship. The set down relationship is a compression of a joint or crossing of the elongation reducing member and the serpentine frame such that the resulting thickness of the joint or crossing is less than the combined thickness of the elongation reducing member and the filament of the serpentine frame.

Optionally, the carrier can include a plurality of warp threads, such as polymeric warp threads, carried on and secured to the limbs by knitting, sewing, threading or otherwise secured to the serpentine frame to encompass a limb within a stitch of each knitted row of warp thread.

In one configuration, the elongation reducing member is a cable secured to a wire serpentine frame, such that the elongation reducing member extends substantially perpendicular to and is joined to the plurality of limbs of the serpentine frame. The resulting joint between each limb and the elongation reducing member defines a thickness that is less than a combined thickness of the wire and the elongation reducing member. In a preferred construction, the elongation reducing member is welded to the serpentine frame to have a set down greater than 20%. That is, at least 20% of the nominal thickness of the thinner one of the elongation reducing member or the frame is within the thickness of the thicker remaining one of the elongation reducing member and the frame. In a further preferred construction, the joint between the elongation reducing member and the filament of the serpentine frame has a thickness that is less than or substantially equal to the thickness of the filament. That is, the elongation reducing member has 100 percent set down with respect to the filament of the serpentine frame.

The carrier can include an elongation reducing member positioned in a central location along the plurality of limbs. In a preferred construction, the elongation reducing member is connected to the serpentine frame to define a neutral axis of the carrier. Alternatively, a first elongation reducing member may be positioned along a first longitudinal axis and a second elongation reducing member positioned along a second longitudinal axis. Alternate configurations are also within the scope of the invention.

A first method for manufacturing the carrier of the present invention, includes forming a filament, such as a wire, into a serpentine configuration having a plurality of limbs interconnected at alternate ends by connecting regions, feeding an elongation reducing member, such as a cable, and the serpentine frame into a welding station and welding the elongation reducing member to the serpentine frame. The method further includes welding the elongation reducing member to the serpentine frame to form a joint thickness that is less than the combined thickness of the filament and the elongation reducing member. A further configuration of the method includes welding the elongation reducing member to the serpentine frame to extend along the longitudinal axis of the carrier, such that the elongation reducing member is secured substantially perpendicular to the plurality of limbs. The method further includes selecting the welding station, the filament and the elongation reducing member to provide at least 20% set down, with a preferred set down of approximately 50% and a more preferred set down of approximately 100%. That is, the resulting joints have a thickness that is no greater than the thickness of the thicker one of the filament or the elongation reducing member.

DETAILED DESCRIPTION OF THE PREFERRED EMBODIMENTS

Figure 1:
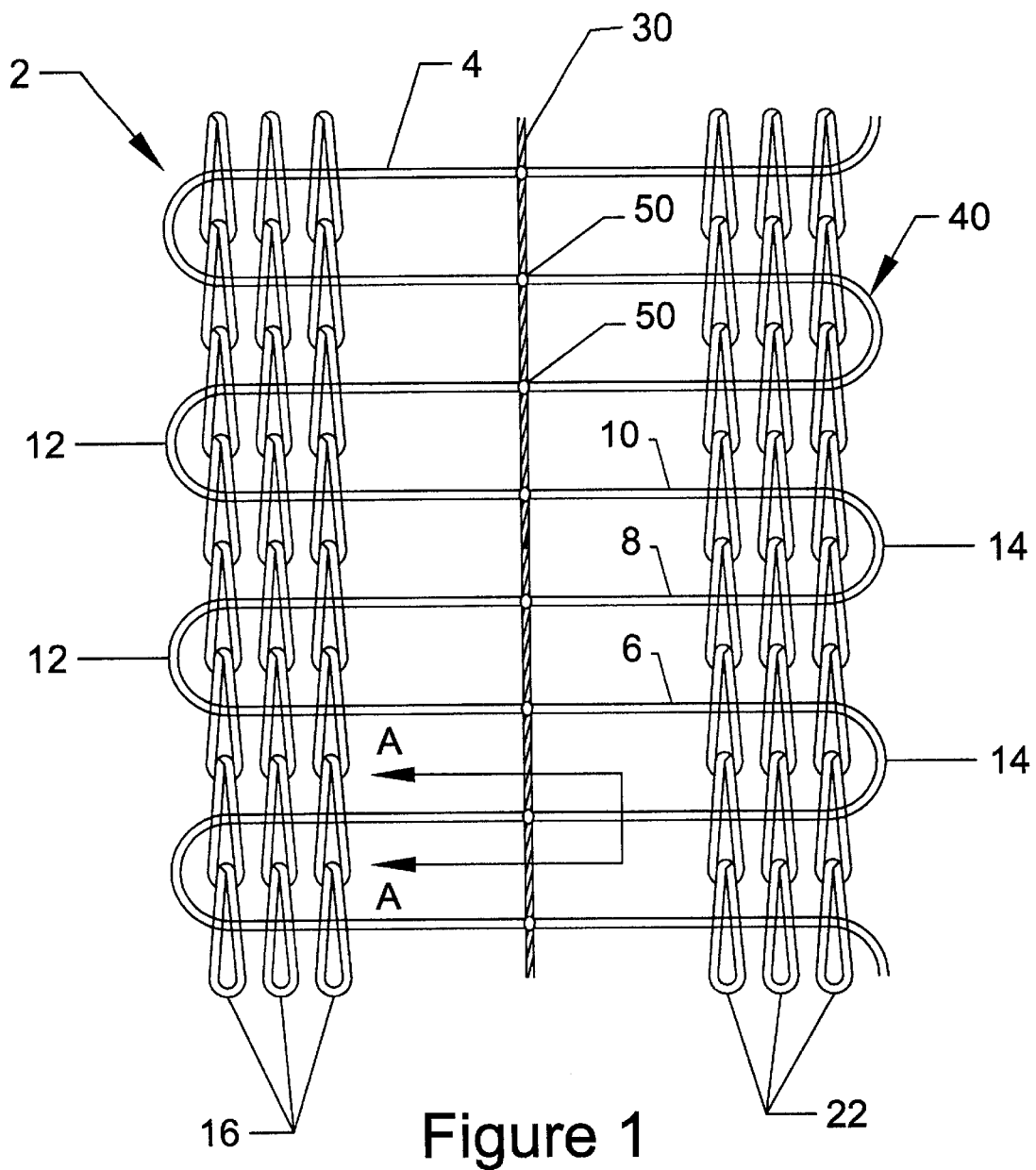
FIG. 1 is a top view of a carrier having an elongation reducing member and a plurality of warp threads.

A carrier 2 in accordance with the present invention is shown in FIGS. 1–3 and 8–9. The carrier 2 includes a serpentine frame 40 and an elongation reducing member 30 connected to the frame. Optionally, the carrier 2 can include warp threads, such as threads 16, 18, 20 and 22.

Serpentine Frame

The serpentine frame 40 has a generally serpentine configuration, with looped connecting edge regions 12, 14 and transverse lengths, or limbs 6, 8, 10 joining the looped edge regions. The limbs 6, 8, 10 can be straight or curved and can define straight sided, banana-shaped or propeller-shaped regions therebetween or any combination thereof. The limbs are a generally parallel relationship, such as adjacent limbs 6, 8, 10 of FIG. 1, or alternating limbs are parallel shown in FIGS. 2, 3, 8 and 9. The serpentine frame 40 has a width substantially defined by a length of the plurality of limbs 6, 8, 10. The serpentine frame 40 can be described in terms of the number of limbs per inch (cm) and the length of the limbs. A range for limbs per inch (limbs per cm) is typically from approximately 4 to 12 limbs per inch (1.6 to 4.7 limbs per cm), with a preferred range of about 7 to 10 limbs per inch (2.8 to 3.9 limbs per cm), and typical lengths of the limbs (defining a width of the carrier 2) range from approximately 0.5 inches (1.3 cm) to approximately 3 inches (7.6 cm).

The serpentine frame 40 is formed of a filament 4, or a plurality of filaments having sufficient resiliency to accommodate repeated flexing while having sufficient strength for the filament to retain the serpentine form. The serpentine frame 40 may be formed of a metallic or non metallic filament 4. The non metallic filament materials include, but are not limited to plastics, elastomers, polymerics, ceramics or composites. Metallic filament materials include but are not limited to wires, alloys, steel, stainless steel, aluminum, galvanized metals, as well as composites.

For purposes of description, the serpentine frame 40 is set forth in terms of a metallic filament 4 such as wire. However, it is understood, the description is applicable to any type of filament 4 forming the serpentine frame 40.

The wire filament 4 has an initial or nominal thickness. The nominal thickness of the wire 4 is at least partially determined by the intended operating environment of the weatherseal as well as the configuration of the available extrusion tooling. Typically, the wire filament 4 has a generally circular cross section. However, it is understood the wire 4 may have any of a variety of cross sectional profiles, such as but not limited to obround, elliptical, faceted, triangular. The filament 4 may be coated with a protective layer, for example, with a rust protective coating, such as a galvanized layer.

In the configuration of the wire filament 4, the wire has a diameter between approximately 0.010 inches (0.25 mm) and 0.050 inches (1.3 mm), with a preferred diameter within approximately 0.018 inches (0.46 mm) to 0.035 inches (0.89 mm). In a more preferred construction, the wire filament 4 is a low carbon steel wire having a diameter of about 0.030 inches (0.76 mm). The resulting wire serpentine frame 40 defines a distance between adjacent limbs that is greater than the thickness of the wire filament 4.

The present serpentine frame 40 is in contrast to the stamped or slotted metal supports often employed in the prior art. Such prior constructions employ a longitudinal strip or band of metal that is stamped, cut or punched to exhibit a plurality of slits or slots extending from an edge of the strip in a direction generally transverse to the longitudinal direction. Often the stamped strip must be subjected to a subsequent working, fracturing or breaking process to provide necessary flexibility. The fabrication of such strips typically produces relatively large amounts of scrap material. Additional distinctions between the present serpentine frame 40 and carriers formed from a stamped metal sheet include greater flexibility and ease of handling the serpentine frame. That is, the serpentine frame 40 exhibits an inherent flexibility about mutually orthogonal axes. The stamped metal frame also tends to exhibit a greater degree of metal fatigue, which can result in failure of the frame.

Referring to FIGS. 1–3 and 8–9, the optional warp threads or yarns 16, 18, 20, 22 (shown in FIG. 2), are secured to the wire serpentine frame 40, such as by knitting, sewing, or threading, to the wire and can form a portion of the carrier 2. The warp threads 16, 18, 20, 22 encompass a portion of the frame 40 within a stitch. The warp threads 16, 18, 20, 22 are secured to the filament 4, preferably with chain stitching to minimize warp drift and the warp threads are pre-tensioned, for example, from approximately 0.5 to 1.0 pounds (0.22 to 0.45 Kg) per warp end, with a most preferred pre-tensioning of preferably approximately 0.7 pounds (0.32 Kg). It is understood the stitching shown in FIGS. 1–3 and 8–9 is representational and that the warps threads can engage the filament 4 by any of a variety of constructions. That is, the warps threads can have a variety of stitch and knot types. Further, the interlacing of the warp threads and the filament 4 can be any of a variety of configurations.

The warp threads 16, 18, 20, 22 can be any of a variety of materials, wherein polymeric materials are preferred. The term polymeric is intended to encompass a polymer based on organic or organo-silicone chemistry. The polymer may be a synthetic resin or a natural fiber, such as cotton. Synthetic resins are generally preferred because they are more durable and resistant to, although not free from, the stresses incurred during encapsulation, for example during extrusion. Suitable polymeric materials include for example polyesters, polypropylenes and nylons, with polyesters being preferred. The warp threads have a typical size of about 400 to 1000 denier.

Although the carrier 2 is shown to include the warp threads 16, 18, 20, 22, it is understood the present invention can be employed without the warp threads. That is, the carrier 2 can be formed of the serpentine frame 40 and the elongation reducing member 30.

If the spacing between the limbs 6, 8, 10 increases due to elongation of the serpentine frame 40 during the extrusion process, then there will be a significant risk of shrinkage, to at least some degree, in the final product because when the limbs spread out the warp threads 16, 18, 20, and 22 are processed with a tensile stress. After the product is final sized, installed, and throughout the life of the product, as the tensile stress is relieved, the entire product will experience shrinkage along the longitudinal axis. Therefore, while elongation may not significantly affect the manufacturing of the carrier 2, the customer receiving the final product may not be satisfied with the product due to shrinkage. The present invention overcomes this shrinkage problem by preventing any change, including an increase, in the spacing between limbs 6, 8, 10 during extrusion processes and subsequent life of the weatherseal, while retaining the flexible nature of the serpentine frame 40. That is, the elongation reducing member 30 is selected to substantially retain the inherent flexibility of the serpentine frame 40, without requiring retooling of the extrusion dies or increased material for processing the carrier 2.

Elongation Reducing Member

The elongation reducing member 30 is connected to the serpentine frame 40 and becomes a part of the carrier 2, as shown in FIGS. 1–9.

The elongation reducing member 30 extends longitudinally along the serpentine frame 40 and is connected to the plurality of limbs 6, 8, 10. As shown in FIGS. 1–3 and 9, the elongation reducing member 30 is shown extending substantially perpendicular to the plurality of limbs 6, 8, 10. However, referring to FIG. 8, it is understood a portion of the elongation reducing member 30 can be inclined relative to the limbs. The elongation reducing member 30 can cross a limb in an inclined relationship. Alternatively, or seen in FIG. 8, the elongation reducing member 30 can cross the limb in a perpendicular relationship, such that the elongation reducing member is inclined with respect to the limbs intermediate of the limbs. Thus, the location of the elongation reducing member 30 relative to the connecting regions 12, 14 can be varied along the length of the carrier 2.

The elongation reducing member 30 has a nominal thickness. The actual cross sectional profile of the elongation reducing member 30 can be any of a variety of configurations. The cross sectional profile of the elongation reducing member 30 can be circular, obround, oval, elliptical or faceted. It is understood other configurations of the elongation reducing member 30 can be employed, such as, but not limited to threads, strands, filaments cords and cables. A preferred cross sectional profile provides a relatively flexible elongation reducing member 30.

The elongation reducing member 30 is selected to exhibit a number of characteristics including minimal elongation while retaining flexibility of the elongation reducing member 30 and the serpentine frame 40. The relevant flexibility is exhibited between adjacent limbs, such as 6, 8, 10 in the serpentine frame 40. That is, the elongation reducing member 30 is selected to be flexible over the distance between adjacent limbs 6, 8, 10. The specific construction of the elongation reducing member 30 can be matched to the desired performance characteristics of the carrier 2 and is at least partially determined by the size and construction of the serpentine frame 40, as well as the encapsulating material.

The elongation reducing member 30 can be any of a variety of materials that exhibit sufficient flexibility and low elongation. The elongation reducing member 30 can be a metallic or non metallic material. In addition, the elongation reducing member 30 can be a single strand, or a plurality of strands, wherein the plurality of strands can assume a cable construction. The term "cable" encompasses metallic and non metallic multi-strand constructions of the elongation reducing member 30. Thus, the term cable includes a bundle of, at least two, strands that permits flexibility, wherein the strands can optionally be twisted together. It is understood that a wire rope is encompassed by the term cable.

A preferred material for the elongation reducing member 30 is a metallic cord and particularly, a metallic cable having a diameter that is less than the nominal thickness of the wire filament 4. The cable is selected to exhibit sufficient flexibility between adjacent limbs 6, 8, 10 of the serpentine frame 40 to preclude a substantial reduction in the flexibility of the serpentine frame 40. That is, the cable allows a limb to be displaced from the plane of adjacent limbs, without increasing the distance between consecutive limbs. Traditionally, carrier flexibility is substantially reduced in prior attempts to reduce elongation, wherein the present construction allows the carrier 2 to form, follow and retain smaller radius curves. The cable is constructed of at least two strands and can include a multitude of strands. It is understood the strands making up the cable can be of like size or varying sizes. The number of strands in the cable and the sizing of the strands within the cable are at least partially determined by the intended operating characteristics of the resulting weatherseal incorporating the carrier 2. Typical materials for the cable include, but are not limited to steel, stainless steel and bright steel. It has been found that for a wire filament 4 having a thickness diameter of approximately 0.030 inches (0.76 mm), a cable diameter of approximately 0.020 to 0.024 inches (0.51 mm to 0.61 mm) and having eight strands is satisfactory. That is, in this configuration, the filament 4 has a greater diameter than the elongation reducing member 30.

The elongation reducing member 30 is connected to the limbs 6, 8, 10 of the serpentine frame 40 at joints of sufficient strength to substantially preclude separation of the elongation reducing member from the respective limb. As shown in FIGS. 4–7, the joints have a thickness that is less than the combined thickness of the wire filament 4 and the elongation reducing member 30. That is, the elongation reducing member is in a set down relationship to the filament 4. The term set down, in terms of a percent, is defined as $$\left[\frac{(\text{Filament Thickness} + \text{Elongation Reducing Member Thickness}) - (\text{Final Joint Thickness})}{(\text{The smaller of the Filament thickness or the elongation reducing member thickness})}\right] \times 100$$

Preferably, at least 20% of one the wire filament 4 or the elongation reducing member 30 is set down into the remaining member. In a more preferred construction, the set down is at least 50%, with an optimal set down of greater than 75% and preferably approximately 100%. That is, for the 100% set down, the joint has a thickness that is equal to the thicker of the elongation reducing member 30 or the filament 4. The amount of set down is sufficient to allow the serpentine frame 40 and joined elongation reducing member 30 to pass through a die originally sized to accommodate the serpentine frame 40 without the elongation reducing member. That is, the combined thickness at the joints is sufficiently small so that the resulting carrier 2 can pass through a die previously sized for the thickness of the wire carrier (without the elongation reducing member 30) and still acquire sufficient extruded material to encapsulate the elongation reducing member 30 with the frame 40. This provides the benefits of substantially precluding elongation (and subsequent shrinkage) of the carrier 2 while retaining the inherent flexibility of the serpentine frame 40 without requiring retooling the extrusion die or requiring additional extruded material to encapsulate the carrier.

The set down joint between the elongation reducing member 30 and the limbs 6, 8, 10 of the serpentine frame 40 is at least partially determined by the materials of the frame and the elongation reducing member. For the serpentine frame 40 and elongation reducing member 30 formed of plastics, the set down joint can be created by a variety of mechanisms, including but not limited to fusion bonding, solvent or chemical bonding, secondary adhesives, as well as ultrasonic welding. Each of these mechanisms creates a joint having a thickness that is less than the combined thickness of the filament 4 and the elongation reducing member 30.

In those constructions having one of the serpentine frame 40 (filament 4) and elongation reducing member 30 being metallic and the remaining one of the frame and elongation reducing member being plastic, secondary adhesives, as well as heat (thermal) bonding can be employed.

For a metallic serpentine frame 40 and metallic elongation reducing member 30, a set down is formed by locally melting one or both of the frame and elongation reducing member in the area of the joint. Referring to FIGS. 4–7, the local melting creates a fused region 50 where a portion of both the filament 4 and the elongation reducing member 30 have been liquefied and cooled. That is, the filament 4 and elongation reducing member 30 have been melted together. Typically, the local melting, or fusing is achieved by welding. It is understood that a multistrand cable having a nominal diameter could be splayed in the area of the joint and bonded or adhered to the serpentine frame 40 by a secondary adhesive, and still achieves the set down relationship.

It has been found advantageous to weld a metallic elongation reducing member 30 to a metallic serpentine frame 40. The welding can be done by a variety of techniques including but not limited to arc welding, heat welding or resistance welding. A preferred welding method is resistance welding. In this configuration, it has been found advantageous to employ an elongation reducing member 30 having a smaller diameter than the wire filament 4. This sizing allows for approximately 100 percent set down of the elongation reducing member 30 into the wire filament 4.

Figure 9:
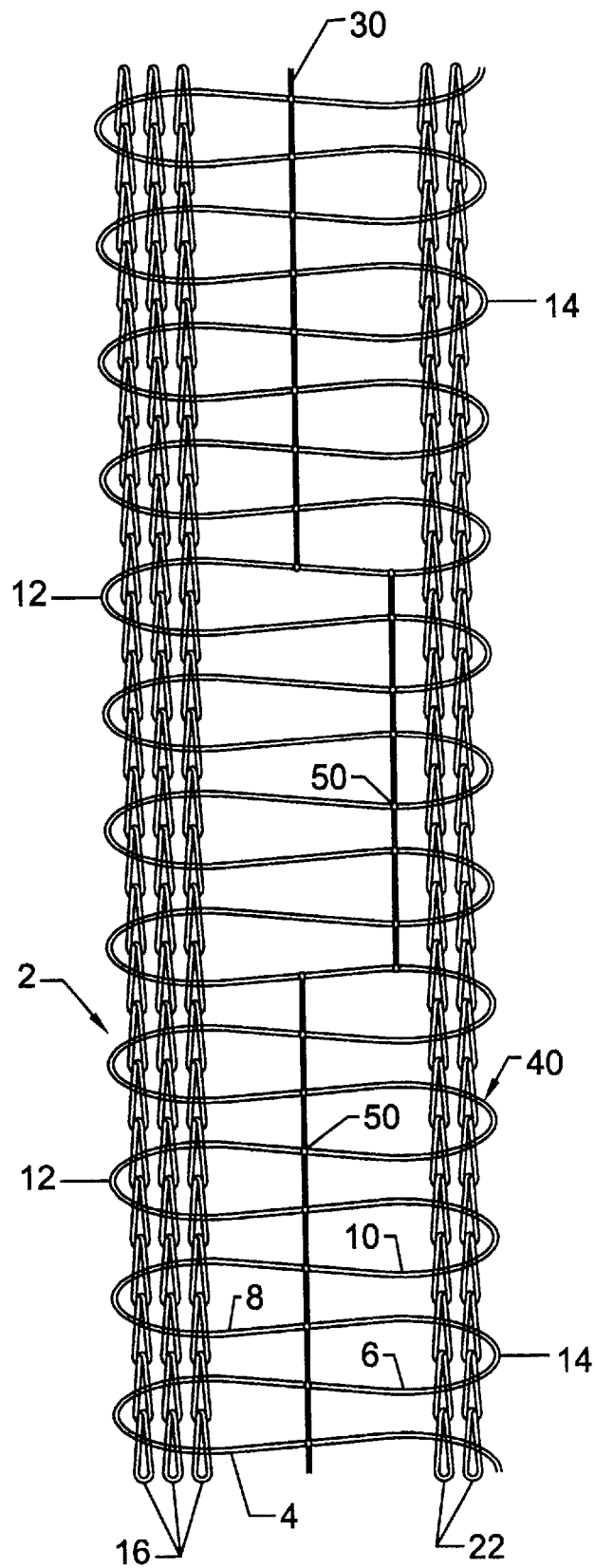
FIG. 9 is a top plan view of a carrier showing further positions of the elongation reducing member relative to the serpentine frame.

The elongation reducing member 30 can be constructed as a continuous member extending the length of the frame 40. Alternatively, the elongation reducing member 30 can be constructed of a plurality of discrete segments, as shown in FIG. 9.

In FIG. 1, a relatively small carrier 2 with warp threads 16 and 22 adjacent connecting regions 12 and 14 is shown with the elongation member 30 located along a middle portion of the carrier.

Figure 2:
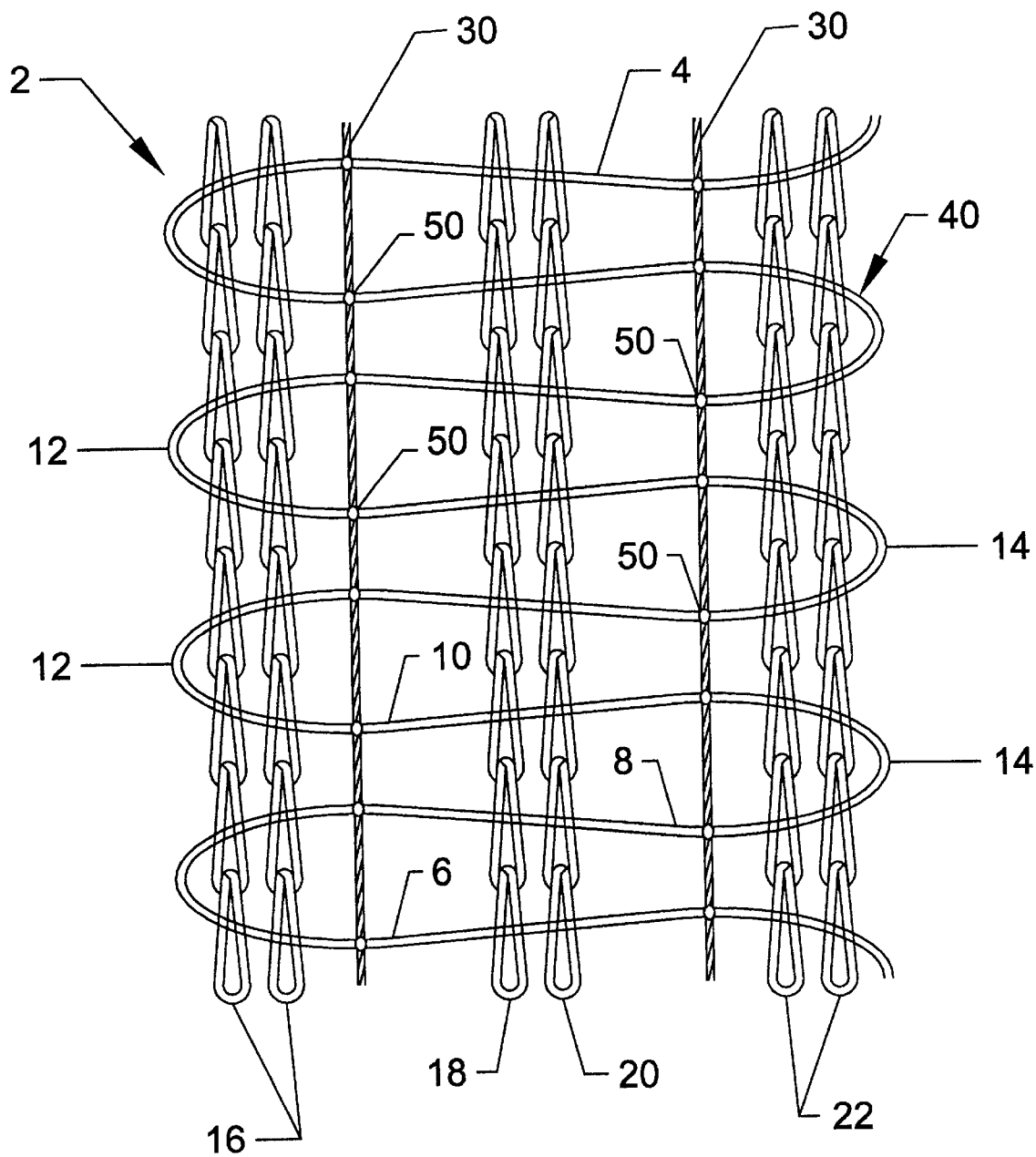
FIG. 2 is a top view of an alternative carrier having a plurality of elongation reducing members and a plurality of warp threads.
Figure 3:
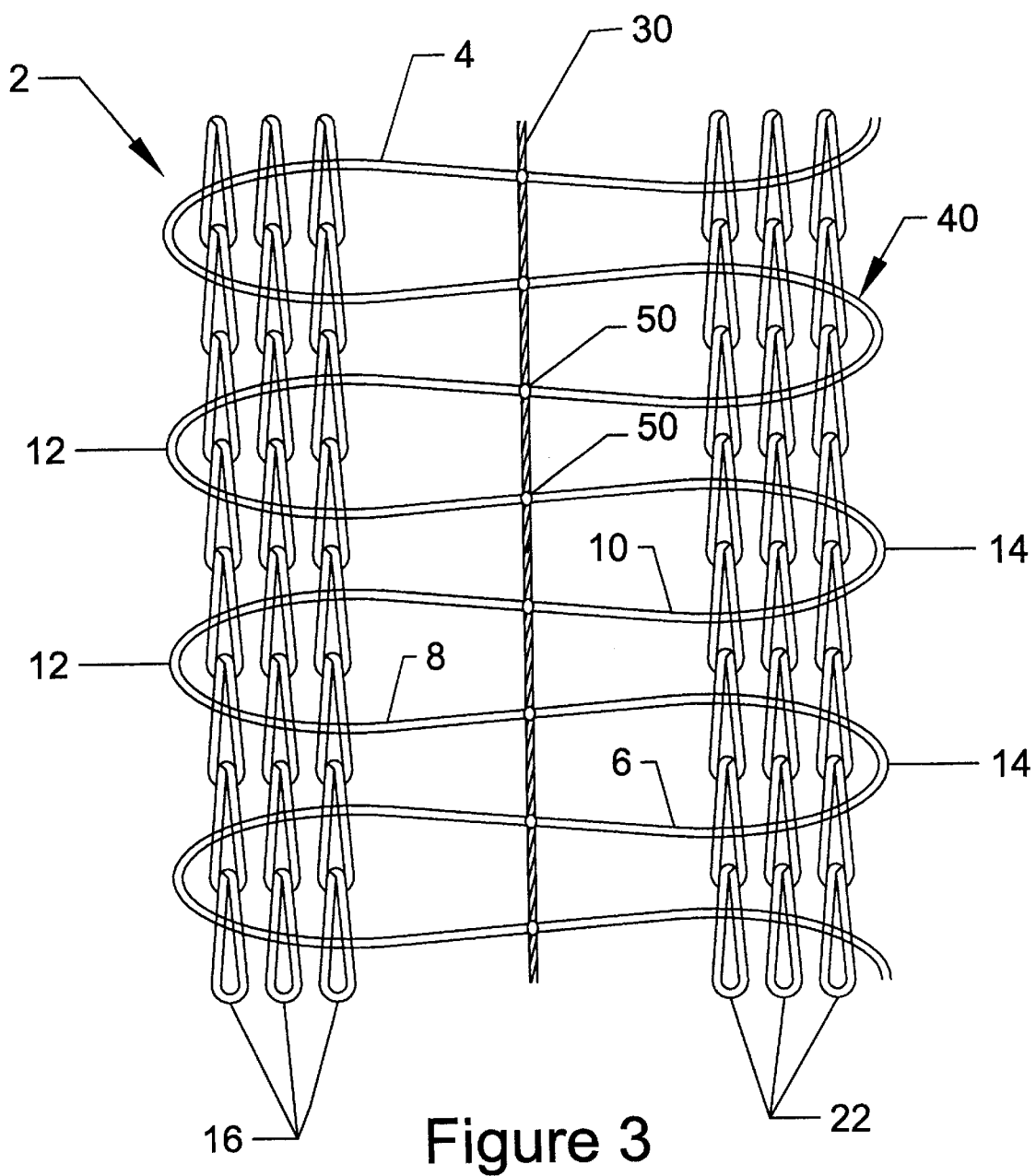
FIG. 3 is a top view of a further configuration of the carrier having an elongation reducing member and warp threads.
Figure 4:
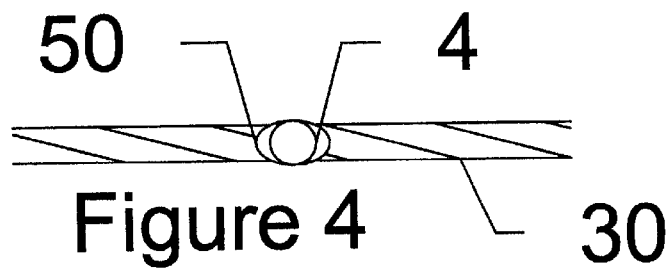
FIG. 4 is a representative cross sectional view taken along lines A—A of FIG. 1 showing a 100% set down relationship.
Figure 5:
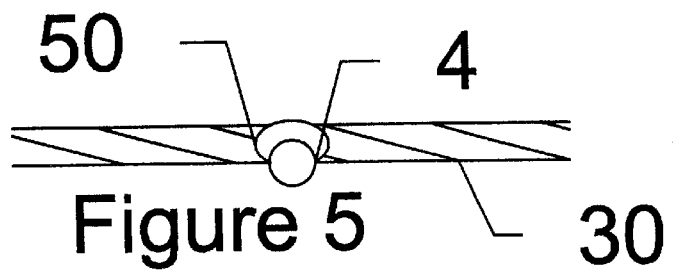
FIG. 5 is a representative cross sectional view taken along lines A—A of FIG. 1 showing an approximately 50% set down relationship.
Figure 6:
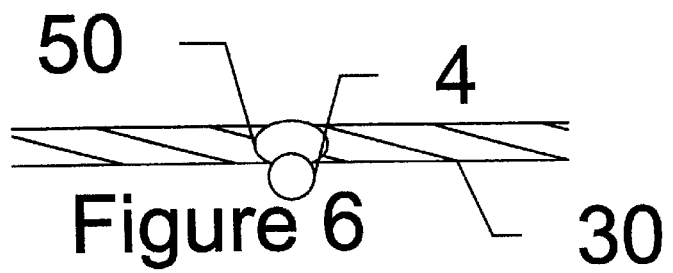
FIG. 6 is a representative cross sectional view taken along lines A—A of FIG. 1 showing an approximately 20% set down relationship.
Figure 7:
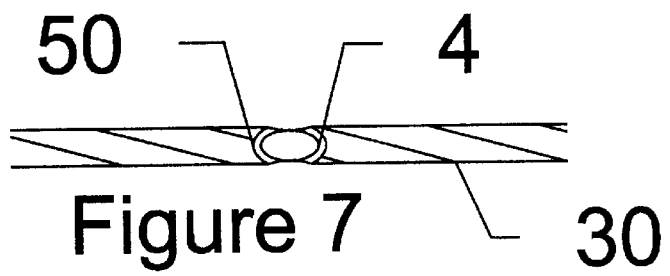
FIG. 7 is a representative cross sectional view taken along lines A—A of FIG. 1 showing a greater than 100% set down relationship.
Figure 8:
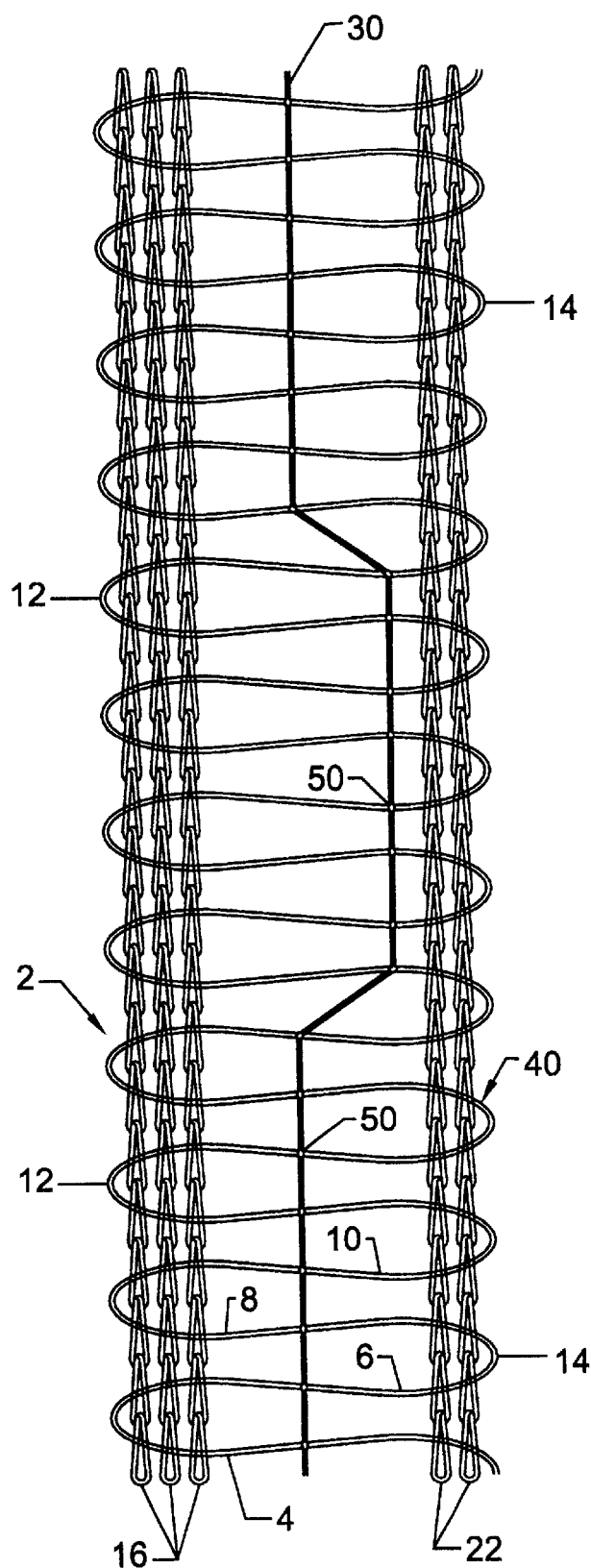
FIG. 8 is a top plan view of a carrier showing alternative positions of the elongation reducing member relative to the serpentine frame.

As shown in FIG. 2, the elongation reducing member 30 can be employed in a larger carrier 2 with warp threads 16, 18, 20, and 22. The carrier 2 is provided with a first elongation reducing member 30 positioned between warp threads 16 and warp threads 18, and a second elongation reducing member 30 positioned between warp threads 20 and warp threads 22. Thus, the carrier 2 is provided with elongation reducing members 30 distributed about the width of the serpentine frame 40. Although two specific embodiments of carriers and placement of elongation reducing members 30 are shown, it should be understood that alternate arrangements of elongation reducing members, with or without warp threads, are within the scope of the present invention. The carrier 2 can be formed with the elongation reducing member 30 extending along or adjacent an edge of the frame 40. Further, any or all of warp threads 16, 18, 20, and 22 could be eliminated or located intermediate one edge of the serpentine frame 40 and the elongation reducing member 30.

The elongation reducing member 30 being an integral part of the carrier 2 prevents elongation of the carrier during subsequent manufacturing operations and during subsequent use of the resulting weatherseal. The prevention of this elongation in turn prevents the warp threads from being processed with a tensile stress which after elastomer, polymer or rubber extrusion can cause the part to "shrink" after being final sized, installed and throughout the life of the part.

The flexibility of the elongation reducing member 30 intermediate adjacent limbs retains at least a substantial portion of the initial flexibility of the serpentine frame 40. In addition, the significant set down eliminates die retooling and avoids increased costs in extrusion material. In fact, it is believed the set down flexible elongation reducing member 30 may be used to reduce or eliminate the use of the polymeric warp threads. The reduction or elimination of the warp threads would further decrease both the cost and processing time of the carrier.

The elongation reducing member 30 can be employed with carrier products that use any thread or yarns which could have elongation during processing such as at extrusion houses. The elongation reducing member 30 prevents the serpentine frame 40 and hence carrier 2 from elongating while being processed. The present carrier 2 also reduces shrinkage once the carrier is encapsulated. Some of the advantages resulting from the present invention include the carrier 2 being provided with increased resistance to elongation and thereby having more precise control of length of the finished product.

The carrier 2 has a neutral axis extending along the longitudinal dimension of the carrier. The neutral axis is that axis along which there is no elongation or compression upon bending or radiusing along the length of the carrier 2. That is, the distance between a corresponding location on an adjacent limb remains constant. The elongation reducing member 30 allows the location of the neutral axis to be set at a predetermined position relative to the frame 40. Thus, the resulting carrier 2 can exhibit different characteristics at different longitudinal locations.

In a method for forming the wire carrier 2 of the present invention, the wire filament 4 is fed from a supply drum through a wire guide and folded to form the serpentine frame 40. This process is well known in the art. The serpentine frame 40 and elongation reducing member 30 are passed through a resistance welding station, where the elongation reducing member is joined to the limbs 6, 8, 10 of the serpentine frame in a set down relationship.

Optionally, a plurality of warp threads are knitted onto the carrier 2 as is known in the art.

Thus, it is apparent that there has been provided, in accordance with the invention, a carrier 2 and a method for making a carrier with reduced elongation. The carrier 2 is produced with an elongation reducing member 30 joined to the plurality of limbs in a sufficiently set down relation to preclude die retooling or increased extrusion material requirements. The strength of the elongation reducing member 30 is sufficient to prevent stretching of the serpentine frame and hence any warp threads during the extrusion process, which eliminates the memory effect of the warp threads that contributes to shrink back. The elongation reducing member 30 also retains the flexibility of the serpentine frame 40 to allow the finished product to follow a smaller radius of curvature than prior constructions. In addition, in those configurations employing warp threads, the elongation reducing member 30 acts as a deterrent to the shrink realized from a decrease in the tensile stress of the warp threads, that results during the curing of the rubber and from environmental effects.

The above-described embodiments are illustrative of some constructions for incorporating an elongation reducing member 30 into a serpentine frame 40. Other embodiments not herein described are within the scope of this invention so long as the carrier 2 is prevented from elongating during extrusion to prevent subsequent shrinkage in a final product.

While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

What is claimed is:

1. A carrier for use in a weatherseal, comprising:
   (a) a serpentine frame having a plurality of limbs interconnected at a alternative ends by connecting regions; the serpentine frame having a longitudinal dimension extending transverse to the plurality of limbs; and
   (b) a metallic cable having at least two strands, the cable extending along the longitudinal dimension of the serpentine frame and connected to a plurality of limbs, wherein the cable is in a set down relationship relative to the plurality of limbs at the connection to the limbs.

2. The carrier of claim 1, wherein the cable is welded to the plurality of limbs.

3. The carrier of claim 1, wherein the serpentine frame is formed of a filament having a filament thickness and the cable has a cable thickness, and the connection between the cable and a limb has a thickness less than a combined thickness of the filament thickness and the cable thickness.

4. The carrier of claim 1, wherein the carrier includes a neutral axis defined by the cable as connected to the plurality of limbs.

5. The carrier of claim 1, further comprising a warp thread connected to the plurality of limbs.

6. The carrier of claim 1, wherein the cable is connected to the plurality of limbs to have a first section substantially parallel to the longitudinal dimension and a second section inclined relative to the longitudinal dimension.

7. The carrier of claim 1, wherein the serpentine frame is formed of a filament having a filament thickness and the cable has a smaller thickness than the filament.

8. The carrier of claim 1, wherein the serpentine frame is formed of a filament having a filament thickness and the cable has a substantially equal thickness.

9. The carrier of claim 1, wherein the serpentine frame is formed of a filament having a filament thickness and the cable has a greater thickness than the filament.

10. The carrier of claim 1, wherein the cable has at least eight strands.

11. The carrier of claim 1, wherein the plurality of limbs are generally parallel.

12. The carrier of claim 1, wherein the serpentine frame and the cable are metallic.

13. The carrier of claim 1, wherein the serpentine frame is non-metallic.

14. The carrier of claim 1, wherein the cable has at least four strands.

15. The carrier of claim 1, wherein the cable is connected to the plurality of limbs in a set down relationship of at least approximately 20 percent.

16. The carrier of claim 1, wherein the cable is connected to the plurality of limbs in a set down relationship of approximately 100 percent.

17. The carrier of claim 1, wherein the cable is connected to the plurality of limbs in a set down relationship greater than 100 percent.

18. A carrier for use in a weatherseal comprising:
   (a) a serpentine frame having a plurality of limbs interconnected at alternative ends by connecting regions; the serpentine frame having a longitudinal dimension extending transverse to the plurality of limbs; and
   (b) an elongation reducing member joined to the plurality of limbs in a set down relationship of at least 20 percent.

19. The carrier of claim 18, wherein the elongation reducing member is a cable.

20. The carrier of claim 18, wherein the set down relationship is at least approximately 50 percent.

21. The carrier of claim 18, wherein the elongation reducing member has a diameter less than a filament forming diameter of the serpentine frame.

22. The carrier of claim 18, wherein the elongation reducing member has a diameter substantially equal to a diameter of a filament forming the serpentine frame.

23. The carrier of claim 18, wherein the elongation reducing member has a diameter greater than a diameter of a filament forming the serpentine frame.

24. The carrier of claim 18, wherein the elongation reducing member includes a first section extending parallel to the longitudinal dimension and a second section extending non-parallel to the longitudinal dimension.

25. The carrier of claim 18, wherein the serpentine frame includes a neutral axis intersecting the plurality of limbs and the elongation reducing member is connected to the limbs along the neutral axis.

26. The carrier of claim 18, further comprising a warp thread connected to the serpentine frame.

27. The carrier of claim 18, wherein the serpentine frame and the elongation reducing member are metallic.

28. The carrier of claim 18, wherein the serpentine frame and the elongation reducing member are non-metallic.

29. The carrier of claim 18, wherein one of the serpentine frame and the elongation reducing member are non-metallic.

30. The carrier of claim 18, wherein one of the serpentine frame and the elongation reducing member are non-metallic, and a remaining one of the serpentine frame and the elongation reducing member is metallic.

31. The carrier of claim 18, wherein the set down relationship is at least approximately 30 percent.

32. The carrier of claim 18, wherein the set down relationship is at least approximately 40 percent.

33. The carrier of claim 18, wherein the set down relationship is at least approximately 60 percent.

34. The carrier of claim 18, wherein the set down relationship is at least approximately 70 percent.

35. The carrier of claim 18, wherein the set down relationship is at least approximately 80 percent.

36. The carrier of claim 18, wherein the set down relationship is at least approximately 90 percent.

37. The carrier of claim 18, wherein the set down relationship is at least approximately 100 percent.

38. The carrier of claim 18, wherein the set down relationship is greater than 100 percent.

39. The carrier of claim 18, wherein the elongation reducing member is a single strand.

40. The carrier of claim 18, wherein the elongation reducing member has a generally circular cross sectional profile.

41. The carrier of claim 18, wherein the elongation reducing member has a cross sectional profile including a linear section.

42. The carrier of claim 18, wherein the elongation reducing member has a cross sectional profile including a pair of parallel sides.

43. A carrier for use in a weatherseal, comprising:
   (a) a non-metallic filament formed into a serpentine frame having a plurality of limbs interconnected at alternative ends by connecting regions; the serpentine frame having a longitudinal dimension extending transverse to the plurality of limbs; and
   (b) a non-metallic elongation reducing member connected to the plurality of limbs at corresponding joints, wherein the elongation reducing member is a cable having a plurality of strands, wherein the filament and the elongation reducing member are in a set down relationship.

44. The carrier of claim 43, wherein the elongation reducing member is fused to the serpentine frame.

45. The carrier of claim 43, wherein the thickness of each joint is substantially equal to a thickness of the filament.

46. The carrier of claim 43, wherein each of the joints has a thickness less than a combined thickness of the filament and the elongation reducing member.

47. The carrier of claim 43, wherein the set down relationship is at least approximately 20 percent.

48. The carrier of claim 43, wherein the set down relationship is at least approximately 50 percent.

49. The carrier of claim 43, wherein the set down relationship is approximately 100 percent.

50. A carrier for use in a weatherseal, comprising:
   (a) a metallic filament formed into a serpentine frame having a plurality of limbs interconnected at alternative ends by connecting regions; and
   (b) a metallic cable having a plurality of strands, the cable connected to the plurality of limbs, wherein the cable is in a set down relationship at the connection with the plurality of limbs.

51. The carrier of claim 50, wherein the cable is metallic.

52. The carrier of claim 50, wherein the set down relationship is at least approximately 20 percent.

53. The carrier of claim 50, wherein the set down relationship is at least approximately 50 percent.

54. The carrier of claim 50, wherein the set down relationship is approximately 100 percent.

55. A carrier for rise in a weatherseal, comprising:
   (a) a non-metallic filament formed into a serpentine frame having a plurality of limbs interconnected at alternative ends by connecting regions; the serpentine frame having a longitudinal dimension extending transverse to the plurality of limbs; and
   (b) a non-metallic elongation reducing member connected to the plurality of limbs at corresponding joints, wherein each of the joints has a thickness less than a combined thickness of the filament and the elongation reducing member.

56. A carrier for use in a weatherseal, comprising:
   (a) a non-metallic filament formed into a serpentine frame having a plurality of limbs interconnected at alternative ends by connecting regions; the serpentine frame having a longitudinal dimension extending transverse to the plurality of limbs; and
   (b) a non-metallic elongation reducing member connected to the plurality of limbs at corresponding joints, wherein the filament and the elongation reducing member are in a set down relationship.

57. The carrier of claim 56, wherein the set down relationship is at least approximately 20 percent.

58. The carrier of claim 56, wherein the set down relationship is at least approximately 50 percent.

59. The carrier of claim 56, wherein the set down relationship is approximately 100 percent.

60. A carrier for use in a weatherseal, comprising:
   (a) a serpentine frame having a plurality of limbs interconnected at alternative ends by connecting regions; the serpentine frame having a longitudinal dimension extending transverse to the plurality of limbs; and
   (b) a metallic cable having at least two helically intertwined strands, the cable extending in a non interwoven relation with the limbs along the longitudinal dimension of the serpentine frame, the cable affixed to the plurality of limbs to preclude movement of the cable along a length of the limbs.

61. The carrier of claim 60, wherein the cable and the plurality of limbs are in a set down relationship.

62. The carrier of claim 60, wherein the serpentine frame is metallic.

63. A carrier for use in a weatherseal, comprising:
(a) a serpentine frame having a plurality of limbs interconnected at alternative ends by connecting regions; the serpentine frame having a longitudinal dimension extending transverse to the plurality of limbs; and
(b) a metallic cable having at least two strands, the cable extending along the longitudinal dimension of the serpentine frame and connected to the plurality of limbs, the serpentine frame formed of a filament having a filament thickness and the cable has a cable thickness, and the connection between the cable and a limb has a thickness less than a combined thickness of the filament thickness and the cable thickness.

64. A carrier for use in a weatherseal, comprising:
(a) a non-metallic filament formed into a serpentine frame having a plurality of limbs interconnected at alternative ends by connecting regions; the serpentine frame having a longitudinal dimension extending transverse to the plurality of limbs; and
(b) a non-metallic elongation reducing member connected to the plurality of limbs at corresponding joints, wherein the elongation reducing member is a cable having a plurality of helically intertwined strands, and the cable non moveably connected to the limbs.

65. A carrier for use in a weatherseal, comprising:
(a) a non-metallic filament formed into a serpentine frame having a plurality of limbs interconnected at alternative ends by connecting regions; the serpentine frame having a longitudinal dimension extending transverse to the plurality of limbs; and
(b) a non-metallic elongation reducing member connected to the plurality of limbs at corresponding joints, wherein the elongation reducing member is a cable having a plurality of strands, wherein each of the joints has a thickness less than a combined thickness of the filament and the elongation reducing member.

66. A carrier for use in a weatherseal, comprising:
(a) a serpentine frame having a plurality of limbs interconnected at alternative ends by connecting regions; the serpentine frame having a longitudinal dimension extending transverse to the plurality of limbs; and
(b) an elongation reducing cable having at least two strands, the cable extending along the longitudinal dimension of the serpentine frame to be non interwoven with the frame and fixedly connected to the plurality of limbs to preclude movement of the cable along a given limb.

* * * * *